United States Patent [19]

Roberts et al.

[11] Patent Number: 4,999,033
[45] Date of Patent: Mar. 12, 1991

[54] INTEGRALLY VALVED, LOW FRICTION INDEXING DESICCANT BED DEHUMIDIFIER

[75] Inventors: Robert E. Roberts, Columbus; Wayne E. Caudle, Johnstown, both of Ohio

[73] Assignee: Bry-Air, Inc., Sunbury, Ohio

[21] Appl. No.: 359,387

[22] Filed: May 31, 1989

[51] Int. Cl.⁵ .............................................. B01D 53/06
[52] U.S. Cl. ...................................... 55/181; 55/208; 55/390
[58] Field of Search ................ 55/34, 60, 77, 78, 180, 55/181, 208, 350, 390, 179

[56] References Cited

U.S. PATENT DOCUMENTS

| | | | |
|---|---|---|---|
| 2,507,607 | 5/1950 | Miller | 55/390 X |
| 2,617,986 | 11/1952 | Miller | 55/390 X |
| 2,759,560 | 8/1956 | Miller | 55/180 X |
| 3,092,477 | 6/1963 | Persson | 55/390 X |
| 3,197,944 | 8/1965 | Westeren et al. | 55/390 X |
| 3,201,921 | 8/1965 | Hayes | 55/179 X |
| 3,621,585 | 11/1971 | Robertson | 55/179 X |
| 3,735,563 | 5/1973 | Adams | 55/179 |
| 3,757,492 | 9/1973 | Graff | 55/390 X |
| 4,238,209 | 12/1980 | LaPointe | 55/390 X |
| 4,452,612 | 6/1984 | Mattia | 55/390 X |
| 4,522,726 | 6/1985 | Berry et al. | 55/390 X |
| 4,589,892 | 5/1986 | Leonard | 55/390 X |
| 4,612,022 | 9/1986 | Berry | 55/78 X |
| 4,653,199 | 3/1987 | McLeod et al. | 55/390 X |
| 4,764,276 | 8/1988 | Berry et al. | 55/390 X |

Primary Examiner—Robert Spitzer
Attorney, Agent, or Firm—Porter, Wright, Morris & Arthur

[57] ABSTRACT

Low volume desiccant dehumidifiers, such as dehumidifiers used for the processing of resin pellets, which provide high dehumidification performance, simplified mechanical arrangement and high reliability in a desiccant dryer optimally suited for low volume applications.

7 Claims, 5 Drawing Sheets

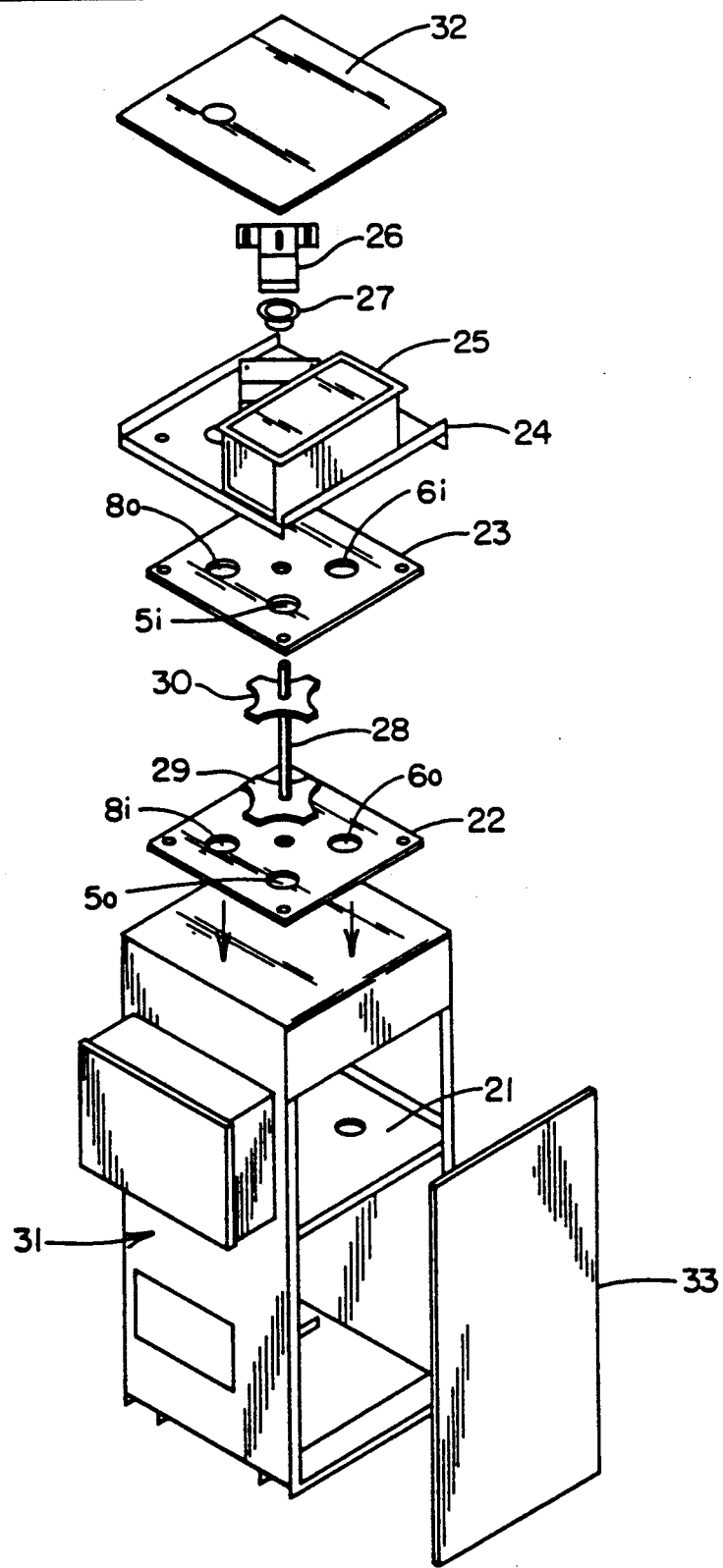

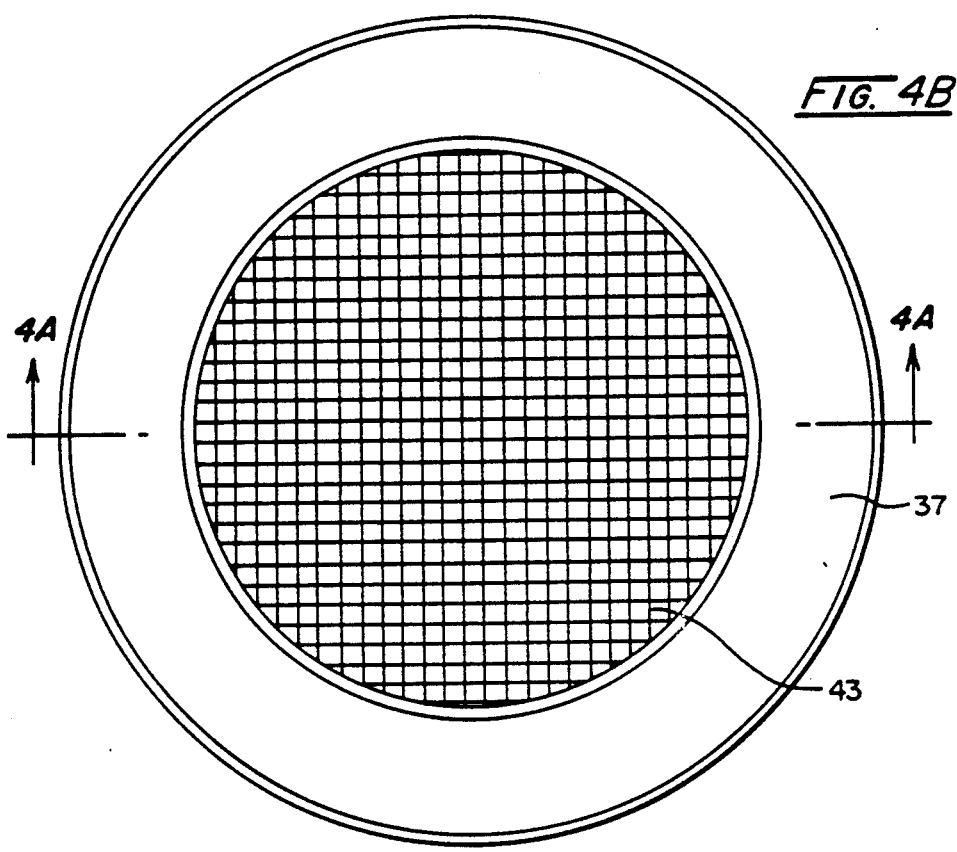
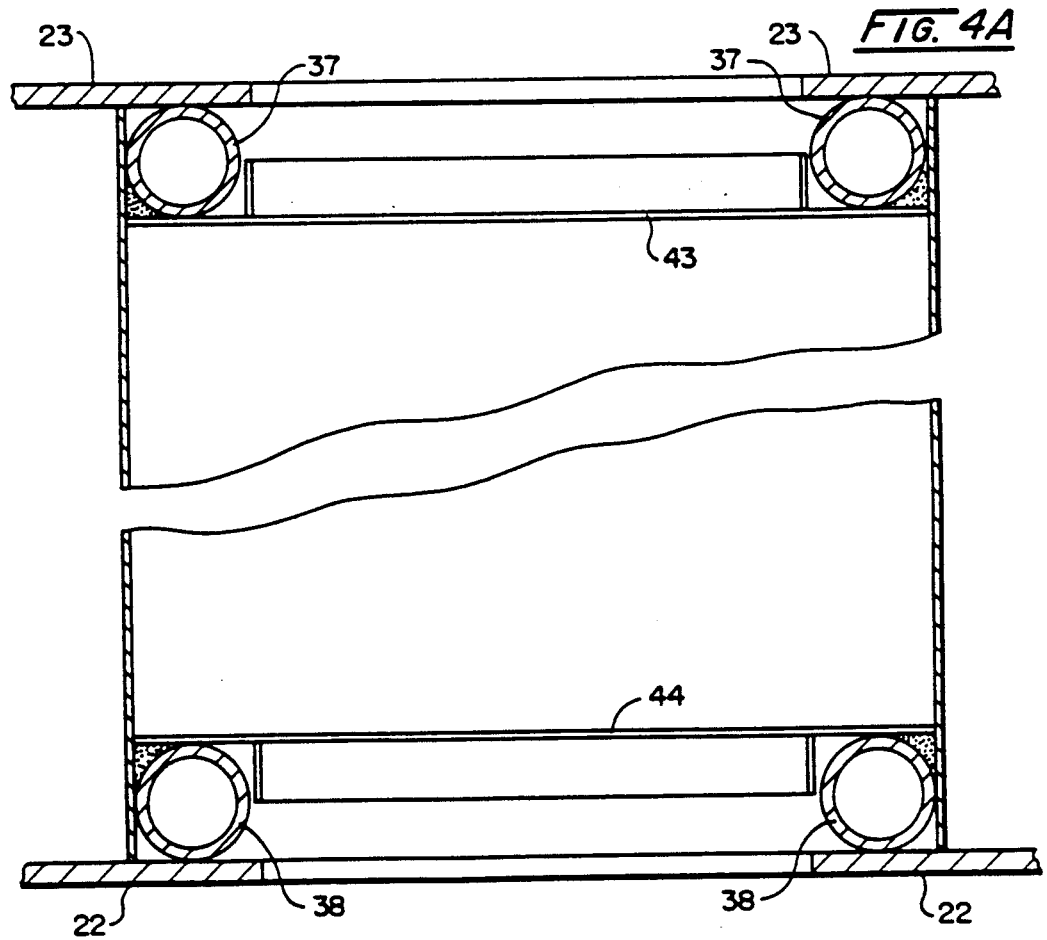

4,999,033

INTEGRALLY VALVED, LOW FRICTION INDEXING DESICCANT BED DEHUMIDIFIER

FIELD OF THE INVENTION

This invention relates to low volume desiccant dehumidifiers such as dehumidifiers used for the processing of resin pellets

BACKGROUND OF THE PRIOR ART

Desiccant humidifiers or dryers using an absorption/desorption cycle are well known but are not particularly suitable for low cubic-feet per minute (CFM) drying applications because the mechanical complexity of the control apparatus for the absorption/desorption cycle increases the cost of such apparatus beyond its economic feasibility in a low volume application.

OBJECTS OF THE INVENTION

It is an object of this invention to provide high dehumidification performance, simplified mechanical arrangement and high reliability in a desiccant dryer optimally suited for low volume applications. The apparatus of the invention will be useful to dry resins for molding, to dry enclosures for scientific pursuits, and to dry other critical materials or spaces. It is an object to provide reduced cost, simplicity, reliability, and improved performance over known types of comparable desiccant bed dryers that require a complicated bed disengagement sequence during the bed indexing process. Such bed dryers tend to be high in cost, require more service and critical adjustments, and generally perform less than optimally. By contrast, the apparatus of the present invention provides an integral valve system that is uncomplicated compared to conventional dryers, which system also enhances drying performance.

BRIEF DESCRIPTION OF THE DRAWINGS

FIG. 2 is an exploded view of the dehumidifying unit.

FIGS. 4A and 4B are respectively a side cross section of a desiccant container and a plan view of the container.

DESCRIPTION OF THE PREFERRED EMBODIMENT

Generally, the apparatus of the invention removes moisture in the vapor state from a sealed air stream by exposing the air to an adsorbing media such as a desiccant. The apparatus of the invention includes a desiccant bed comprising a plurality of essentially identical modular desiccant containers which at any time are classified in one of three isolated stages or conditions of a dehumidification operating cycle, such that as to any individual desiccant container, all the desiccant in the container is classified in one of the three stages.

Water vapor removal occurs during the process or drying stage of an operating cycle of the claimed invention. After the adsorption limit of the desiccant media has been reached, the media is reactivated by exposing it to a second air stream of an elevated temperature in the reactivation stage of an operating cycle. During reactivation, moisture adsorbed during the previous process phase of the cycle is driven from the media preparing it for further process stages. A third stage in the cycle permits cooling of the desiccant to eliminate heat carryover from reactivation to process stage and to reduce drops in performance experienced during a bed index.

The entire cycle of the claimed apparatus comprising process drying, reactivation and cooling is carried out on a continuous basis with respect to individual desiccant containers mounted in a bed. The bed is intermittently rotated a predetermined segment of a circle between fixed, low friction sealing plates so that at any one time a particular desiccant container is in one of the process, reactivation, or cooling positions of the apparatus's cycle. A constant drying action is thereby attained with continuous flow of air into the desiccant bed. The process and reactivation air streams are independent of each other to prevent contamination of the dry air stream.

Further, the apparatus of the invention provides positive sealing of the bed desiccant at all times, including bed indexing during operation of the apparatus of the invention.

Figure 1:
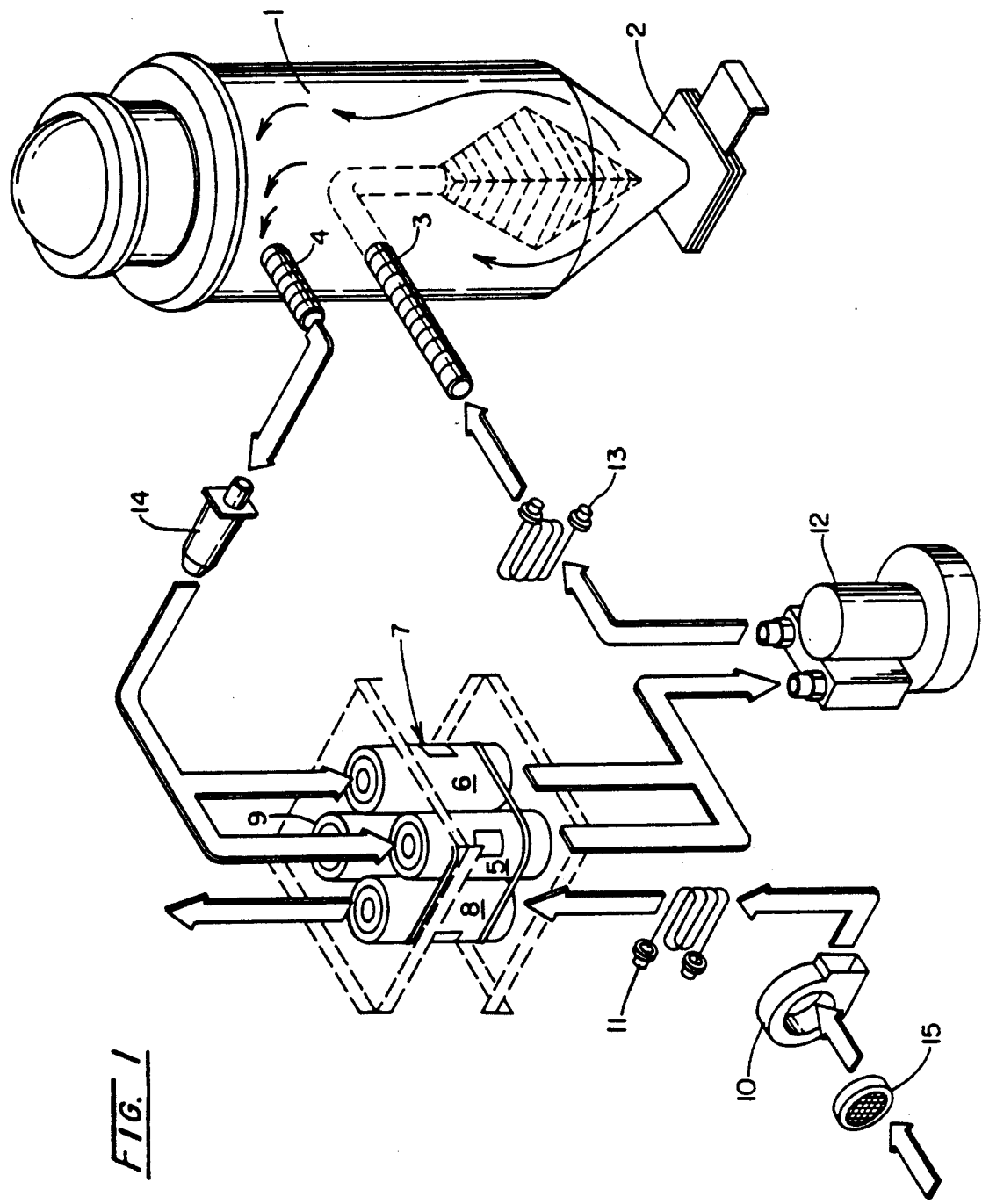
FIG. 1 shows a general outline of a typical dehumidification cycle and dehumidifier apparatus.

FIG. 1 illustrates the arrangement and air flow Pattern of the dryer of the invention. The dryer is designed with the process and reactivation air streams flowing in opposite directions, i.e. in a counter flow relationship thereby promoting performance and energy efficiency.

In FIG. 1 there is shown a plastic hopper 1 feeding to an extruder 2. The hopper has inlet and outlet orifices 3 and 4 respectively for a flow of process stage drying air, to which in turn are connected hoses or ducts to respective connections in the process sections 5 and 6 of the four container desiccant bed 7. The desiccant container in section 8 of the desiccant bed of the apparatus undergoes reactivation. A reactivation air stream which is passed through a blower 10 and heater 11 and passes through a hose or duct connected to reactivation section 8 of the bed eliminates moisture adsorbed in the section 8 desiccant container during the prior process step of the cycle. The fourth desiccant container in section 9 of the bed, which previously was subjected to reactivation is maintained in the cooling step of a cycle immediately prior to the time that this desiccant container is once again used in the process step of the cycle. A blower 12 and heater 13 for the two process sections are provided. Filters may also be provided for the process inlet stream 14 and reactivation inlet stream 15.

In FIG. 2 there is shown the assembly of the desiccant bed in a vented cabinet with the desiccant containers not depicted for purpose of clarity. In the cabinet assembly a first, fixed planar lower sealing panel 21 is provided. This panel is covered by a first lower replaceable sealing plate 22 spaced apart by a suitable distance from a second upper fixed sealing plate 23 removably mounted on the upper sealing panel 24. Process filter box 25 communicating with the two desiccant containers in process sections 5 and 6 may be mounted on the upper sealing panel.

The upper and lower sealing plates provide a low friction surface upon which seals of the desiccant containers cooperatively engage and rotate during indexing of the desiccant bed between process, reactivation, and cooling connections. The upper and lower sealing plates contain a number of apertures corresponding to the number of process condition and regeneration condition desiccant containers desired in a given desiccant bed. Corresponding numbers for process and regeneration air stream connections are indicated. For example, the apparatus depicted in FIG. 1 contains two apertures in each sealing plate to provide connections to process air and one aperture to provide connection to regeneration air. Desiccant containers in the cooling condition remain sealed between the sealing plates with no plate apertures provided for cooling. The combination of the desiccant container seals with the low friction sealing plates provides an integrally valved system that allows the desiccant to be essentially sealed from ambient air during both the process phases of cycles and during indexing of the desiccant bed. Thus conventional valving required for bed engagement and disengagement is eliminated with the present invention.

The sealing plates are coated with a polymeric low friction coating such as that marketed by DuPont Company, FBFP Department, Teflon ® Finishes, Wilmington, Delaware 19898, under trademarks Teflon ®, SilverStone ®, and SilverStone SUPRA as described in Product Bulletins TC-216-894; TC-224-85; TC-225-84 and TC-227-84 with respect to specifications and applications of the coating through the applications of primer, intermediate coat and top coat. These low friction coatings are of the polytetrafluoroethylene class of chemical compositions, of their equivalent. The sealing plate base metal is initially shot peened to increase adhesion of a base coat of low-friction material to the base metal. In an example, low friction c coating sold under the trademark SilverStone ® by DuPont Corporation as referred to above is applied to the so prepared base metal comprising each of the upper and lower sealing plates. A primer coat, for example, DuPont Primer 459-516 is first applied at a thickness of a minimum of up to about 1.5 mils and baked at 300° F. for six minutes. An intermediate coat of material, for example, DuPont Intermediate Coat 456-227, is then applied at a thickness of a minimum of up to about 1.5 mils and while the intermediate coat is still wet, a clear top coat, for example, DuPont top coat 456-300 is applied at a thickness of a minimum of up to 1.5 mils. These coating layers are all applied in accordance with recommended specifications of DuPont Company in the Product Bulletins referred to above. The coated plates are then sintered for ten minutes at 800° to fuse the top coat to the intermediate coat.

Control of the indexing of the desiccant containers is determined by an indexing motor 26, connected by sprocket 27 or other suitable means to the bed shaft assembly comprising shaft 28 and axial spacing means 29 and 30 conforming to the outer shape of the desiccant containers. An enclosure cabinet 31 may include removable top cover 32 and side access panel 33 or other panels determined by application requirements. Provided on each of lower and upper sealing plates 22 and 23 are three openings positioned radially on the plates equidistant from shaft 28. Lower sealing plate 22 contains outlets for process sections 5 and 6, denoted 5o and 6o respectively, and an inlet for process section 8, denoted 8i. Similarly, upper sealing plate 23 contains inlets 5i and 6i for process sections 5 and 6, and outlet 8o for process section 8. The indexing motor intermittently rotates the bed desiccant between lower sealing plate 22 and upper sealing plate 23 a predetermined angular segment, for example, 90°, around the axis of shaft 28 at a predetermined time interval, depending upon the particular application, to the various process and regeneration air connections.

Figure 3A:
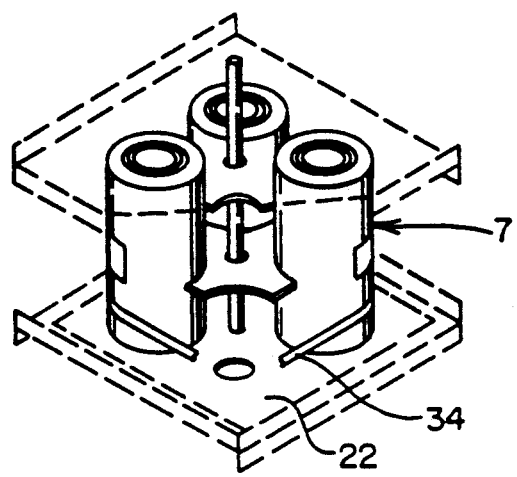
FIGS. 3A and 3B respectively depict a cutaway of the bed rotation between plates and the assembly relationship of a desiccant container.

The FIG. 3A cutaway view of the desiccant bed rotation between sealing plates 22 and 23 shows further the arrangement of the desiccant containers of bed 7. Retaining band 34 holds the desiccant containers in place as the entire shaft, axial spacing means, and four desiccant containers of the bed rotate as a unit between the stationary sealing plates to each of the four process sections 5,6,8, and 9.

Figure 3B:
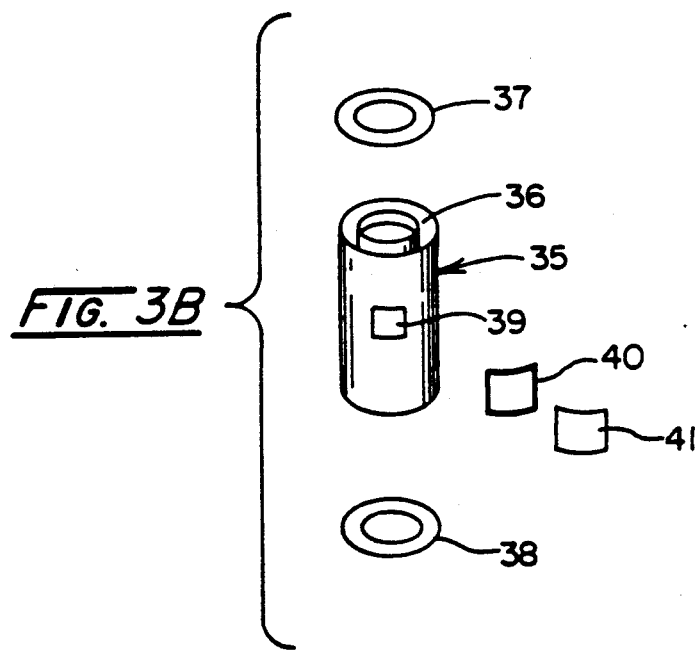

The assembly of a typical desiccant container as seen in FIG. 3B shows a desiccant container 35 comprising a hollow cylindrical solid body with seal retaining areas on the perimeters both ends of the body (only upper retaining area 36 shown) which hold in place upper bed seal 37 and lower bed seal 38. The bed seals are preferably hollow o-rings of silicone rubber, the size of which varies with the size of the desiccant container used. A typical specification for a 20 CFM unit is as follows:

| FORM: | HOLLOW O-RING |
|---|---|
| SIZE: | 11/16" OD, 3/32" WALL THICKNESS |
| MATERIAL: | SILICONE RUBBER |
| HARDNESS: | 50-60 DUROMETER |
| COLOR: | RED |
| TENSILE STRENGTH: | 1100 PSI |
| ELONGATION (MIN): | 400% |
| TEAR (MIN): | 110 PPI |
| COMPRESSION SET: | 70 HOURS @ 3/5 DEG. F. (MAX) - 25% |

A desiccant fill hole 39 is provided in the container body which is closed by a fill hole cover gasket 40 and finally a fill hole cover 41 after the container is filled with desiccant or other adsorbing medium. Upper and lower bed seals of each desiccant container in a desiccant bed serve to continuously seal the desiccant from ambient air, thereby enabling continuous drying.

FIG. 4A shows a side cross section view of one of the desiccant containers that comprise the desiccant bed which includes a cylindrical sectioned solid side 42, having screens or perforated termi 43, 44 at each end to maintain the desiccant (not shown) in place. The container includes seals 37 and 38 around the circumference of each end of the container which sealingly press against the lower 22 and upper 23 sealing plates to provide a tight seal that prevents the escape of process or drying air during the times that the desiccant containers are connected to process and regenerating air streams as well as during bed indexing.

A plan view of a desiccant container shown in FIG. 4B depicts the top, a typical desiccant container showing placement of a screen 43 at the end of the container and bed seal 37.

Figure 5:
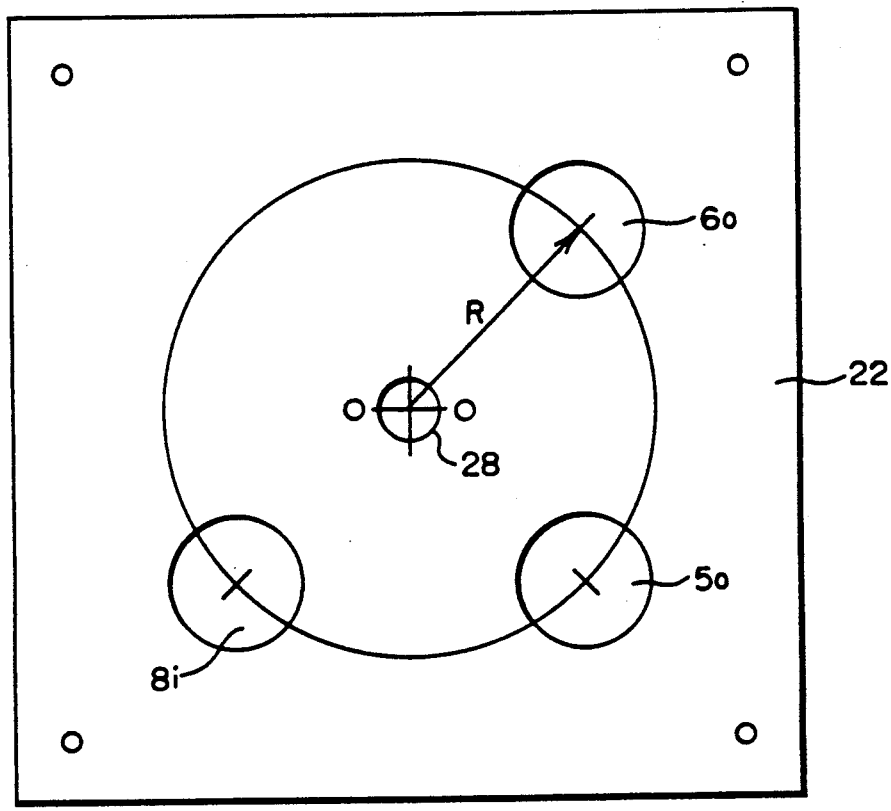
FIG. 5 shows an image of the base and top plates of the invention in a plan view.

FIG. 5 shows a plan view of replaceable sealing Plate 22 which is identical in the upper position or lower position. As above-described, the plate provides two outlet openings, 5o and 6o for the flow of drying process air and one inlet opening, 8i, for reactivation air, spaced distance R from shaft 28.

EXAMPLE

In an exemplary application as a plastics dryer, the apparatus of the invention has a process CFM of 20 at 10" ESP and a reactivation CFM of 10. The dryer is equipped with a process heater of 1.75 KW and reactivation heater of 1.25 KW. Depending on the application, the dryer may be used for polymeric materials such as ABS, acrylic, barex, nylon 6/6, polycarbonate, PBT, PET, polysulfone, polyurethane, noryl, SAN, and vinyls (PVC) that require drying temperatures from 160° to 375° F. and drying times from 1 to 6 hours at a drying rate of from 25 to 40 pounds per hour.

While we have set forth a description of the preferred embodiment utilizing specific spatial relationships, other spatial orientations or modifications are apparent to those skilled in the art and are intended to be within the scope of the claimed invention. In particular, dryer apparatuses embodying the claimed invention can be constructed with any number of desiccant containers in a desiccant bed for each of process, regeneration, and cooling stages of a cycle, in which case the low friction sealing plates with the required openings for process and regeneration connections can be appropriately constructed.

What is claimed is:

1. In a dehumidifying apparatus in which a desiccant medium is cyclically shifted between an operating active process condition, a regenerating condition, and a cooling condition, the improvement comprising:
   (1) a rotatable desiccant bed having a plurality of essentially identical modular desiccant containers being disposed substantially parallel to a central bed axis, each of said containers containing a desiccant medium and having a pair of air permeable surfaces situated on each end of said containers which permit the flow of air from one side of a container to the other side through the desiccant and sealing means on each end of each container;
   (2) two fixed parallel low friction sealing plates cooperatively engageable with the sealing means on each end of each desiccant container in said bed, having a plurality of apertures to provide a first isolated class of air process containers in which the bed desiccant is active, a second isolated class of containers in which the bed desiccant is in a regenerating condition, and a third isolated class of containers in which the bed desiccant is in a cooling condition after it has been regenerated and prior to the time it is in active process such that each desiccant container in said bed only in the process and regeneration stage has associated with it a pair of apertures in said sealing plates, and each desiccant container in said bed in the cooling stage is not associated with any apertures in said plates, whereby heat dissipates independently of forced air flow through said desiccant container in the cooling stage, said sealing plates;
   (a) being operatively disposed with respect to connections with the process and regeneration air flows to define separate process or regeneration sections in the apparatus for the counter flow of air through the beds in each respective class of containers; and
   (b) being further operatively disposed with respect to said seals on the ends of each desiccant container so as to provide continuous sealing of said containers such that rotation of said bed a predetermined angular segment of a circle permits sealed cyclical process, regeneration, and cooling conditions to occur; and
   (3) motor means for intermittently rotating said bed with respect to said fixed sealing plates about a predetermined angular segment around the axis of said bed a predetermined time interval to shift a desiccant container in the first class of active air process containers to the regenerating condition, and then to the cooling condition, and then again to the active condition.

2. The apparatus of claim 1 further comprising means for directing the flow of regeneration air to the class of regenerating condition containers in a direction which is countercurrent to the flow of air through said desiccant containers while said containers are in the process condition.

3. The apparatus of claim 1 wherein said sealing means comprise gasket means disposed with respect to the perimeters of each end of each desiccant container to permit continuous sealing of the end of said containers with said sealing plates during the rotation of said desiccant bed between said sealing plates.

4. The apparatus of claim 1 wherein said desiccant containers are cylindrical in shape and contain two air permeable surfaces which face said two sealing plates.

5. The apparatus of claim 1 in which said sealing plates are coated with a polymeric low friction coating of the class of polytetrafluoroethylene compounds or their equivalent.

6. The apparatus of claim 1 wherein said sealing plates are shot peened to increase adhesion of a low friction material to be applied to said sealing plates.

7. The apparatus of claim 1 further comprising a hopper operatively connected to said desiccant bed by inlet and outlet air flow means.

* * * * *